(12) United States Patent
Belnap et al.

(10) Patent No.: US 7,862,634 B2
(45) Date of Patent: Jan. 4, 2011

(54) POLYCRYSTALLINE COMPOSITES REINFORCED WITH ELONGATED NANOSTRUCTURES

(75) Inventors: J. Daniel Belnap, Pleasant Grove, UT (US); Guodong Zhan, Spring, TX (US); Xiayang Sheng, Sugar Land, TX (US); Youhe Zhang, Tomball, TX (US); Madapusi K. Keshavan, The Woodlands, TX (US); Harry Pratt, Humble, TX (US); Yuelin Shen, Houston, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 11/939,350

(22) Filed: Nov. 13, 2007

(65) Prior Publication Data

US 2008/0209818 A1 Sep. 4, 2008

Related U.S. Application Data (60) Provisional application No. 60/858,830, filed on Nov. 14, 2006, provisional application No. 60/977,806, filed on Oct. 5, 2007.

(51) Int. Cl.
B24D 3/02 (2006.01)
(52) U.S. Cl. ............................. 51/307; 51/293
(58) Field of Classification Search .................. 51/307, 51/293
See application file for complete search history.

(56) References Cited

U.S. PATENT DOCUMENTS

| | | | |
|---|---|---|---|
| 2,941,241 A | 6/1960 | Strong | |
| 2,941,248 A | 6/1960 | Hall | |
| 2,947,611 A | 8/1960 | Bundy | |
| 3,609,818 A | 10/1971 | Wentorf, Jr. | |
| 3,767,371 A | 10/1973 | Wentorf, Jr. et al. | |
| 4,104,344 A | 8/1978 | Pope et al. | |
| 4,124,888 A | 11/1978 | Washburn | |
| 4,288,248 A | 9/1981 | Bovenkerk et al. | |
| 4,289,503 A | 9/1981 | Corrigan | |
| 4,341,577 A | 7/1982 | Vandenburgh | |
| 4,428,906 A | 1/1984 | Rozmus | |
| 4,525,178 A | 6/1985 | Hall | |
| 4,656,002 A | 4/1987 | Lizenby et al. | |
| 4,673,414 A | 6/1987 | Lavens et al. | |
| 4,694,918 A | 9/1987 | Hall | |
| 4,744,943 A | 5/1988 | Timm | |
| 4,945,073 A | 7/1990 | Dubensky et al. | |
| 4,954,139 A | 9/1990 | Cerutti | |
| 5,127,923 A | 7/1992 | Bunting et al. | |
| 5,290,507 A | 3/1994 | Runkle | |
| 5,370,195 A | 12/1994 | Keshavan et al. | |
| 5,769,176 A | 6/1998 | Sumiya et al. | |
| 6,613,383 B1 | 9/2003 | George et al. | |
| 6,790,425 B1 | 9/2004 | Smalley et al. | |
| 6,913,827 B2 | 7/2005 | George et al. | |
| 6,934,600 B2 | 8/2005 | Jang et al. | |
| 6,951,578 B1 * | 10/2005 | Belnap et al. | 75/231 |
| 7,005,391 B2 | 2/2006 | Min et al. | |
| 7,033,408 B2 * | 4/2006 | Fries et al. | 51/307 |
| 7,048,999 B2 | 5/2006 | Smalley et al. | |
| 7,087,832 B2 * | 8/2006 | Scher et al. | 136/250 |
| 7,087,833 B2 * | 8/2006 | Scher et al. | 136/252 |
| 7,105,596 B2 | 9/2006 | Smalley et al. | |
| 7,306,828 B2 * | 12/2007 | Barrera et al. | 427/427 |
| 7,384,436 B2 * | 6/2008 | Sung | 51/293 |
| 2003/0012951 A1 | 1/2003 | Clarke et al. | |
| 2004/0029706 A1 | 2/2004 | Barrera et al. | |
| 2004/0206470 A1 | 10/2004 | Bayazitoglu | |
| 2007/0187153 A1 | 8/2007 | Bertagnolli | |

FOREIGN PATENT DOCUMENTS

| | | |
|---|---|---|
| DE | 102006060776 A1 | 6/2008 |
| EP | 0890705 A2 | 1/1999 |
| JP | 2006/255853 A | 9/2006 |
| JP | 2006255852 A | 9/2006 |
| WO | 98/46384 A2 | 10/1998 |
| WO | 2007/030707 A1 | 3/2007 |

OTHER PUBLICATIONS

Jeffrey R. Wank et al., Nanocoating individual cohesive boron nitride particles in a fluidized bed by ALD; Powder Technology 142 (2004) 59-69.
Extended European Search Report for Application No. 07120709, dated Jul. 3, 2009 (12 pages).

* cited by examiner

Primary Examiner—Timothy C Vanoy
Assistant Examiner—Michelle Hou
(74) Attorney, Agent, or Firm—Osha Liang LLP

(57) ABSTRACT

A sintered polycrystalline composite for cutting tools that includes a plurality of diamond or cubic boron nitride particles; a plurality of nanotube materials; and a refractory or binder material is disclosed. Methods of forming such polycrystalline composites that include integrating or mixing a plurality of nanotube materials with diamond or cubic boron nitride particle and/or refractory or binder particles are also disclosed.

21 Claims, 5 Drawing Sheets

POLYCRYSTALLINE COMPOSITES REINFORCED WITH ELONGATED NANOSTRUCTURES

CROSS-REFERENCE TO RELATED APPLICATIONS

This application, pursuant to 35 U.S.C. §119(e), claims the benefit of U.S. Patent Application No. 60/858,830 filed on Nov. 14, 2006, and U.S. Patent Application No. 60/977,806 filed on Oct. 5, 2007, both of which are incorporated by reference in their entirety

BACKGROUND OF INVENTION

1. Field of the Invention

Embodiments disclosed herein relate generally to polycrystalline composites used in cutting tools.

2. Background Art

Historically, there have been two types of drill bits used for drilling earth formations, drag bits and roller cone bits. Roller cone bits include one or more roller cones rotatably mounted to the bit body. These roller cones have a plurality of cutting elements attached thereto that crush, gouge, and scrape rock at the bottom of a hole being drilled. Several types of roller cone drill bits are available for drilling wellbores through earth formations, including insert bits (e.g. tungsten carbide insert bit, TCI) and "milled tooth" bits. The bit bodies and roller cones of roller cone bits are conventionally made of steel. In a milled tooth bit, the cutting elements or teeth are steel and conventionally integrally formed with the cone. In an insert or TCI bit, the cutting elements or inserts are conventionally formed from tungsten carbide, and may optionally include a diamond enhanced tip thereon.

The term "drag bits" refers to those rotary drill bits with no moving elements. Drag bits are often used to drill a variety of rock formations. Drag bits include those having cutting elements or cutters attached to the bit body, which may be a steel bit body or a matrix or composite bit body formed from a matrix material such as tungsten carbide surrounded by an binder material. The cutters may be formed having a substrate or support stud made of carbide, for example tungsten carbide, and an ultra hard cutting surface layer or "table" made of a polycrystalline diamond material or a polycrystalline boron nitride material deposited onto or otherwise bonded to the substrate at an interface surface.

Polycrystalline diamond (PCD), a composite material formed from diamond particles, comprises a polycrystalline mass of diamonds (typically synthetic) that are bonded together to form an integral, tough, high-strength mass or lattice. A metal catalyst, such as cobalt, may be used to promote recrystallization of the diamond particles and formation of the lattice structure. Thus, cobalt particles are typically found within the interstitial spaces in the diamond lattice structure. The resulting PCD structure produces enhanced properties of wear resistance and hardness, making PCD materials extremely useful in aggressive wear and cutting applications where high levels of wear resistance and hardness are desired. However, cobalt has a significantly different coefficient of thermal expansion as compared to diamond. Therefore, upon heating of a diamond table, the cobalt and the diamond lattice will expand at different rates, causing cracks to form in the lattice structure and resulting in deterioration of the diamond table. Additionally, the presence of cobalt in the interstitial spaces may catalyze the graphitization of the diamond upon exposure to frictional heat generated during cutting.

In order to obviate this problem, strong acids may be used to "leach" the cobalt from the diamond lattice structure. Examples of "leaching" processes can be found, for example in U.S. Pat. Nos. 4,288,248 and 4,104,344. Briefly, a hot strong acid, e.g., nitric acid, hydrofluoric acid, hydrochloric acid, or perchloric acid, or combinations of several strong acids may be used to treat the diamond table, removing at least a portion of the catalyst from the PCD layer. By leaching out the cobalt, thermally stable polycrystalline (TSP) diamond may be formed. In certain embodiments, only a select portion of a diamond composite is leached, in order to gain thermal stability without losing impact resistance.

However, several problems exist with the leaching cobalt from polycrystalline diamond. Firstly, leaching is performed with strong acids during which the strong acids may attack the surfaces of the diamond grains within the polycrystalline diamond and cause micro-pitting (notches) of the diamond grain. Such micro-pits are weak points that degrade the diamond grain and hence the ability of the diamond grain to support a load, thus giving the structure a susceptibility to crack origination. Additionally, interstitial voids in the polycrystalline diamond are left following the removal of cobalt, leaving the structure weakened to cutting loads, brittle, and less shock resistant. Further, leaching frequently results in non-uniform removal of cobalt, leaving pockets of non-leached cobalt within the diamond lattice, which can retain heat and cause localized graphitization of diamond, limiting the life of the cutter.

Alternatively, TSP may be formed by forming the diamond layer in a press using a binder other than cobalt, one such as silicon, which has a coefficient of thermal expansion more similar to that of diamond than cobalt has. During the manufacturing process, a large portion, 80 to 100 volume percent, of the silicon reacts with the diamond lattice to form silicon carbide which also has a thermal expansion similar to diamond. The thermal resistance is somewhat improved, but thermal degradation still occurs due to some residual silicon remaining, generally uniformly distributed in the interstices of the interstitial matrix. Further, there are mounting problems with this type of PCD element because there is no bondable surface.

Generally, such conventional PCD materials exhibit extremely high hardness, high modulus, and high compressive strength, and provide a high degree of wear protection to a cutting or drilling element. However, in more complex wear environments known to cause impact and fretting fatigue, layers formed from conventional PCD can fail by gross chipping and spalling. For example, drilling inserts coated with a thick PCD monolayer may exhibit brittleness that causes substantial problems in practical applications. Conventional methods of improving the performance of PCD layers include optimizing grain size and controlling cobalt content to increase toughness, but the effect of these methods is limited. Further, attempts to improve the thermal operating limitations of the diamond to greater than that of conventional PCD (~750° C.), while somewhat effective with respect to thermal instability, frequently exchange one problem (thermal instability) for another, as described above.

Designers continue to seek improved properties (such as improved wear resistance, thermal resistance, fracture toughness, etc.) in the ceramic materials. Further, as the bulk particles used in ceramic materials decrease in size with the increasing use of nanoparticles (grain sizes less than 100 nm), observed brittleness has limited potential applications for the resulting material. It has been known for some time that the addition of fibrous materials to materials may increase mechanical properties, such as strength. However, incorporation of the fibrous materials, such as carbon fibers, has presented difficulties including resistance to wetting of the fibers.

Accordingly, there exists a need for improvements in the material properties of diamond composite materials used in drilling applications.

SUMMARY OF INVENTION

In one aspect, embodiments disclosed herein relate to a polycrystalline composite that includes a plurality of interconnected diamond or cubic boron nitride particles; a refractory or binder material; and a plurality of elongated nanostructures integrated into the polycrystalline composite.

In another aspect, embodiments disclosed herein relate to a method of forming a polycrystalline composite body for cutting tools that includes integrating a plurality of plurality of elongated nanostructures in one of a plurality of diamond or cubic boron nitride particles and a binder material; mixing the other of the one of a plurality of diamond or cubic boron nitride particles and a refractory or binder material; and sintering the mixture.

In yet another aspect, embodiments disclosed herein relate to a method of incorporating functionalized nanotubes in a polycrystalline material that includes applying a coating to nanotubes by atomic layer deposition; mixing a plurality of diamond or cubic boron nitride particles, a refractory or binder material, and a plurality of the coated nanotubes; and sintering the mixture.

Other aspects and advantages of the invention will be apparent from the following description and the appended claims.

DETAILED DESCRIPTION

In one aspect, embodiments disclosed herein relate to composite materials used in components of downhole cutting tools, including drill bits, etc. In particular, embodiments relate to polycrystalline composite materials formed from diamond or cubic boron nitride particles and a binder material, with elongated nanostructures incorporated therein.

Ceramic materials generally used in the cutting tool industry include metal carbides, borides, silicides, nitrides, and diamond. Cermet materials are materials that comprise both a ceramic material and a metal material. An example cermet material is polycrystalline diamond that has been formed from synthesizing diamond crystals and a ductile metal binde or polycrystalline cubic boron nitride that has been formed from bonding cubic boron nitride particles with a metal binder.

As used in this specification, the term "polycrystalline diamond" (PCD) refers to the material produced by subjecting individual diamond particles and additives to sufficiently high pressure and high temperature that intercrystalline bonding occurs between adjacent diamond particles. Similarly, the term "polycrystalline cubic boron nitride (PCBN) refers to the material produced by subjecting individual cubic boron nitride particles and additives to sufficiently high pressure and high temperature that intercrystalline bonding occurs between adjacent cubic boron nitride particles. PCD and PCBN composites of this invention are specifically designed to provide an improved degree of thermal stability, fracture toughness and chipping resistance, without substantially sacrificing wear resistance, when compared to conventional pure PCD and PCBN materials.

Diamond particles used to form a PCD composite may be either natural or synthetic. A metal catalyst additive, such as cobalt, may be used to promote interconnection of the diamond particles and formation of a rigid body, or lattice structure. Thus, metal catalyst or binder particles are typically found in the interstitial spaces in the diamond lattice structure. Higher metal content forms a larger relative ductile phase in the composite and usually improves impact resistance. Alternatively, the PCD composite body may be formed from a composite including diamond crystals, a binder material, and particles of carbides or carbonitrides of the transition metals selected from the group consisting of W, Ti, Ta, Cr, Mo, Cb, V, Hf, Zr, and mixtures thereof.

PCBN composites may be formed from cubic boron nitride; however, alternatively, other boron nitrides such as hexagonal and/or wurtzitic boron nitride (which may be converted to cubic boron nitride during HTHP processing conditions) may be used. During such high temperature, high pressure processing the individual crystals of cubic boron nitride (CBN) become bonded together to form a polycrystalline mass. The resulting PCBN is a continuous phase and a refractory supporting phase is comingled with the PCBN phase. The residual content of the polycrystalline cubic boron nitride composite may include at least one of Al, Si, and mixtures thereof, carbides, nitrides, carbonitrides and borides of Group IVa, Va, and VIa transition metals of the periodic table.

Catalyst materials that may be used to form the refractory or relative ductile phase of the various composites of the present disclosure may include various group IVa, Va, and VIa ductile metals and metal alloys including, but not limited to Fe, Ni, Co, Cu, Ti, Al, Ta, Mo, Nb, W, V, and alloys thereof, including alloys with materials selected from C, B, Cr, and Mn. In another embodiment, the ductile binder phase may include a compound containing silicon and/or titanium and oxygen, and a titanate, silicate, or complex oxide of a metal selected from the group of iron, cobalt, nickel and manganese in another embodiment. The use of titanates and silicates as binders is described, for example, in U.S. Pat. No. 5,769,176, which is herein incorporated by reference in its entirety. In yet another embodiment, the ductile binder phase may include any of the compositions that may comprise the ultra-thin coating discussed below.

Figure 1:
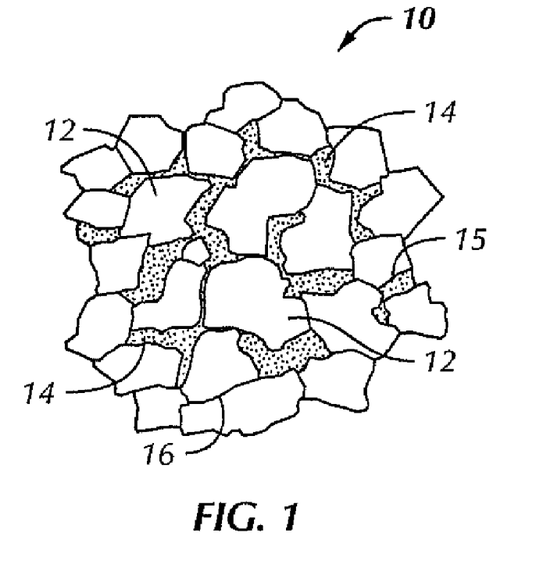
FIG. 1 is a schematic of a microstructure of a conventional polycrystalline diamond material.

FIG. 1 is a microstructure of a conventional PCD material 10 comprising diamond grains 12 that are bonded to one another with interstitial volumes occupied by a binder material 14, e.g., cobalt. Desired properties of such conventional PCD materials are, for example, thermal stability, wear resistance, high modulus, and high compressive strength. Such conventional PCD materials may comprise a binder material or metal content up to about 30 percent by weight, and the metals employed as the binder can include Co, Ni, Fe, and mixtures thereof. The particular amount of the metal component that is used is typically controlled to provide a compromise between such properties as thermal stability, toughness, and hardness. The polycrystalline microstructure shown is similar in all polycrystalline materials, including PCD and PCBN.

For conventional PCD materials, the properties of toughness and hardness are inversely related to one another and are dependent on the relative amount of metal and diamond grains used to form the material. The presence of diamond grains and related diamond bonding is necessary to provide properties of high strength and wear resistance to the material. However, too much diamond grains or diamond bonding in the material may produce an undesired level of chipping. The presence of metal in the PCD material can help to improve chipping resistance but adversely impact the PCD material properties of high strength and wear resistance. Therefore, the amount of metal that is used to form the PCD material is preferably that amount that provides a desired improvement in chipping resistance without significantly impacting strength and wear resistance. The compromise in these mechanical properties makes conventional PCD unsuited for use in certain demanding applications that call for a high degree of chipping resistance, strength, and wear resistance.

Further, as described above, conventional polycrystalline diamond formed from diamond particles and a cobalt catalytic binder possess thermal instability at temperatures greater than 750° C. This thermal instability is largely due to the difference between the coefficients of thermal expansion for diamond and cobalt. Specifically, upon heating of a diamond table, the cobalt and the diamond lattice will expand at different rates, causing cracks to form in the lattice structure and resulting in deterioration of the diamond table.

Referring still to FIG. 1, it is evident that the binder material 14 is not continuous throughout the microstructure in the conventional PCD material. Rather, the microstructure of the conventional PCD material may have a uniform distribution of binder among the PCD granules. Thus, crack propagation through the conventional PCD material will often travel through the less ductile and brittle diamond grains, either transgranularly through diamond grain/binder interfaces 15, or intergranularly through the diamond grain/diamond grain interfaces 16. The strength of a given diamond to diamond bond is limited by particle size, impurities in the sintered powders, and individual crystal to crystal misorientation. As a result, conventional PCD materials often exhibit gross brittle fracture during more demanding applications, which may lead to catastrophic material and part failure. The distribution of cobalt throughout the microstructure, in addition to causing cracks, may also promote graphitization of the diamond causing, thus affecting the operational limitations of the material.

Generally, embodiments of the present disclosure may include composite constructions comprising diamond or cubic boron nitride particles and a refractory or binder material, where the composite is also provided with an elongated nanostructure. The elongated nanostructure may provide chipping resistance independent of the inherent limitations of PCD or PCBN, therefore providing a microstructure that has significant strength independent of the sintering or particle size characteristics of the PCD or PCBN material. Further, the incorporation of elongated nanostructures may provide a polycrystalline diamond composite that possesses a thermal stability greater than 750° C., the typical limit for conventional PCD. A PCB or PCBN material formed with a reinforcing elongated nanostructure may find particular use as cutting tool components.

As used herein, the term "elongated nanostructure" refers to various materials having one principle axis longer than the other two principle axes, such as a cylindrical or tubular configuration, with at least one dimension, such as length or diameter, between 1 and 100 nanometers. Types of elongated nanostructures that may find use as a reinforcing nanotube material in the present disclosure may include nanofibers, nanorods, and nanotubes. Nanofibers refer to cylindric or tubular nanostructures and include nanotubes, which are perfect cylinders. Nanorods refer to a rod-like structure having a surface and a substantially solid core. Nanotubes that may find use in the composites of the present disclosure include both carbon nanotubes (CNTs) (single-walled (SWNT) and multi-walled (MWNT)), and inorganic nanotubes. Additionally, in some embodiments, the reinforcing elongated nanostructure may be functionalized.

Carbon nanotubes are polymers of pure carbon, which may be functionalized or otherwise modified. Both SWNTs and MWNTs are known in the art and the subject of a considerable body of published literature. Examples of literature on the subject are Dresselhaus, M. S., et al., Science of Fullerenes and Carbon Nanotubes, Academic Press, San Diego (1996), and Ajayan, P. M., et al., "Nanometre-Size Tubes of Carbon," Rep. Prog. Phys. 60 (1997): 1025-1062. The structure of a single-wall carbon nanotube may be described as a single graphene sheet rolled into a seamless cylinder whose ends are either open or closed. When closed, the ends are capped by either half fullerenes or more complex structures including pentagons.

Nanotubes frequently exist as "ropes," or bundles of 10 to 100 nanotubes held together along their length by van der Waals forces, with individual nanotubes branching off and joining nanotubes of other "ropes." Multi-walled carbon nanotubes are multiple concentric cylinders of graphene sheets. The cylinders are of successively larger diameter to fit one inside another, forming a layered composite tube bonded together by van der Waals forces, with a typical distance of approximately 0.34 nm between layers, as reported by Peigney, A., et al., "Carbon nanotubes in novel ceramic matrix nanocomposites," Ceram. Inter. 26 (2000) 677-683.

Carbon nanotubes are commonly prepared by arc discharge between carbon electrodes in an inert gas atmosphere. The product is generally a mixture of single-wall and multi-wall nanotubes, although the formation of single-wall nanotubes can be favored by the use of transition metal catalysts such as iron or cobalt. The electric arc method, as well as other methods for the synthesis of carbon nanotubes is described in, for example, "Nanometre-Size Tubes of Carbon," P. M. Ajayan and T. W. Ebbesen, Rep. Prog. Phys., 60, 1025-1062 (1997).

Inorganic nanotubes (or nanorods/nanofibers) may include those prepared from a range of materials including boron nitride, silicon nitride, silicon carbide, dichalcogenides, for example, $WS_2$, oxides such as $HfO_2$ and $MoO_3$, metallic nanotubes, such as Co and Au, and materials having a composition $B_xC_yN_z$, where x, y, and z may be independently selected from 0 to 4, including for example, $BC_2N_2$ and $BC_4N$, and combinations thereof.

In a particular embodiment, the average diameter of the elongated nanostructures may range from about 1 to 100 nanometers. In various embodiments, the reinforcing phase may include SWNTs having an average diameter of about 1 to 2 nanometers and/or MWNTs having an average diamond of about 2 to 30 nanometers. Nanotube and nanofiber materials typically have a very high aspect ratio, that is, the ratio of length to diameter. In a particular embodiment, the nanotubes and/or nanofibers used in the present disclosure may have an aspect ratio ranging from about 25 to 1,000,000, and preferably from about 100 to about 1,000. Conversely, nanorods typically have a low aspect ratio, ranging from 3 to 10.

The surface of the elongated nanostructures may, in one embodiment, be functionalized prior to incorporation into the composites of the present disclosure. In a particular embodiment, the elongated nanostructures of the present disclosure may be provided with ultra-thin, conformal coating thereon. As used herein, "ultra-thin" refers to a thickness of less than 100 nm. In a particular embodiment, the ultra-thin coating may have a thickness ranging from about 0.1 to about 50 nm, from about 0.5 to 35 nm in another embodiment, and from about 1 to 10 nm in yet another embodiment. "Conformal" refers to a relatively uniform thickness across the surface of the particle such that the surface shape of a coated particle is substantially similar to that of the uncoated particle.

Depending on the desired application of the elongated nanostructure, type of elongated nanostructure, and type of particulate material to which the elongated nanostructure is added, the composition of the coatings may vary. In a particular embodiment, the coating may include a sinterable material including, for example, metals, metal alloys, ceramic materials, and cermets.

For example, coatings that may be suitable for use on the elongated nanostructures of the present disclosure may include metals and binary materials, i.e., materials of the form $Q_xR_y$, where Q and R represent different atoms and x and y are numbers that reflect an electrostatically neutral material. Among the suitable binary materials are various inorganic ceramic materials including oxides, nitrides, carbides, sulfides, fluorides, and combinations thereof. Examples of oxides that may find use in the present disclosure include those such as $CoO$, $Al_2O_3$, $TiO_2$, $Ta_2O_5$, $Nb_2O_5$, $ZrO_2$, $HfO_2$, $SnO_2$, $ZnO$, $La_2O_3$, $Y_2O_3$, $CeO_2$, $Sc_2O_3$, $Er_2O_3$, $V_2O_5$, $SiO_2$, $In_2O_3$, and the like. Examples of nitrides that may find use in the present disclosure include those such as $Si_3N_4$, AlN, TaN, NbN, TiN, MoN, ZrN, HfN, GaN, and the like. Examples of carbides that may find use in the present disclosure include those such as SiC, WC, and the like. Examples of sulfides that may find use in the present disclosure include those such as ZnS, SrS, CaS, PbS, and the like. Examples of fluorides that may find use in the present disclosure include those such as $CaF_2$, $SrF_2$, $ZnF_2$, and the like. Among the suitable metal coatings include Pt, Ru, Ir, Pd, Cu, Fe, Co, Ni, W, and the like. Other types of materials that may be used to form an ultra-thin conformal coating include those described in U.S. Pat. No. 6,613,383, which is hereby incorporated by reference in its entirety. Coatings suitable for use in the present disclosure may also include mixed structures, such as TiAlN, Ti3AlN, ATO (AlTiO), coatings including doped metals, such as ZnO:Al, ZnS:Mn, SrS:Ce, $Al_2O_3$:Er, $ZrO_2$:Y, which may also include other rare earth metals ($Ce^{3+}$, $Tb^{3+}$, etc.) for doping or co-doping, or nanolaminates, such as $HfO_2/Ta_2O_5$, $TiO_2/Ta_2O_5$, $TiO_2/Al_2O_3$, $ZnS/Al_2O_3$, and the like. Further, other inorganic species such as inorganic polymers may be suitable for coatings of the present disclosure, including inorganic polymers such as, for example, polysilanes, polysiloxanes, polystannanes, polyphosphazene, polysulfides, and hybrid polymers of a grafted inorganic and organic polymer.

In a particular embodiment, the coating itself may be a reagent or catalyst that functions as a sintering aid in the formation of a PCD composite. Thus, the ultra-thin coating may provide a high surface area of catalyst or reactive material and/or provide a means for finely dispersing the coating material. For example, the tubular or cylindric materials of the present disclosure may be coated with a material such as aluminum oxide, which may function as a sintering aid. When the coating comprises such a sintering aid or catalyst compound, it may or may not be desirable to add additional binder powder to the hard particles for sintering. For example, in forming PCD or PCBN, it may be desirable to only include binder in the form of a conformal coating (such as Co, Ni, or Fe, and Al- or Ti-containing compounds, respectively), which may allow for decreased amounts of binder necessary to effect formation of the polycrystalline structure. This may also reduce the amount of binder pooling that may cause thermal instability in the structure. A porous microstructure may result when no additional binder material is added; however, such pores may be reduced by either furthering consolidation or by filling the volume with a secondary material, such by processes known in the art and described in U.S. Pat. No. 5,127,923, which is herein incorporated by reference in its entirety.

In a particular embodiment, the ultra-thin, conformal coating of the present disclosure may be applied on the tubular materials through atomic layer controlled growth techniques or atomic layer deposition (ALD). An advantage of the ALD process over other deposition methods (CVD, PE-CVD, PVD, and liquid sol-gel) is the unique conformality of the deposited films, which allows the ALD films to cover all sides of particles. This may provide an optimal method to prevent nanocomposites from oxidation if oxidation-resistant films are further conformally deposited. ALD deposition of coatings is described, for example, in U.S. Pat. No. 6,913,827, which is herein incorporated by reference in its entirety.

ALD methods use self-limiting surface chemistry to control deposition. Under the appropriate conditions, deposition may be limited to a small number of functional groups on the surface, i.e., approximately one monolayer or $\sim 1 \times 10^{15}$ species per $cm^2$. ALD permits the deposition of coatings of up to about 0.3 nm in thickness per reaction cycle, and thus provide a means for controlling thickness to extremely fine thicknesses. In these techniques, the coating may be formed in a series of two or more self-limited reactions, which in most instances can be repeated to subsequently deposit additional layers of the coating material until a desired coating thickness is achieved. In most instances, the first of these reactions may involve some functional group on the surface of the particle, such as an M-H, M-O—H, or M-N—H group, where M represents an atom of a metal or semi-metal. The individual reactions may be carried out separately and under conditions such that all excess reagents and reaction products are removed before concluding the succeeding reaction. The particles may optionally be treated prior to initiating the reaction sequence to remove volatile materials that may have absorbed onto the surface of the particulate materials. This may be readily done by exposing the particles to elevated temperatures and/or vacuum.

Additionally, in some instances a precursor reaction may be performed to introduce desirable functional groups onto the surface of the tubular material to facilitate a reaction sequence in creating an ultra-thin coating. Examples of such functional groups include hydroxyl groups, amino groups, and metal-hydrogen bonds, which may serve as a site of further reaction to allow formation of an ultra-thin coating. Functionalization may be achieved through surface treatments including, for example, water plasma treatment, ozone treatment, ammonia treatment, and hydrogen treatment.

Oxide coatings may be prepared on particles having surface hydroxyl or amine (M-N—H) groups using a binary (AB) reaction sequence as follows. The asterisk (*) indicates the atom that resides at the surface of the particle or coating, and Z represents oxygen or nitrogen. $M^1$ is an atom of a metal (or semimetal such as silicon), particularly one having a valence of 3 or 4, and X is a displaceable nucleophilic group. The reactions shown below are not balanced, and are only intended to show the reactions at the surface of the particles (i.e., not inter- or intralayer reactions).

$$M\text{-}Z\text{---}H^* + M^1X_n \rightarrow M\text{-}Z\text{-}M^1X^* + HX \quad (A1)$$

$$M\text{-}Z\text{-}M^1X^* + H_2O \rightarrow M\text{-}Z\text{-}M^1OH^* + HX \quad (B1)$$

In reaction A1, reagent $M^1X_n$ reacts with one or more M-Z-H groups on the surface of the particle to create a "new" surface group having the form $-M^1X$. $M^1$ is bonded to the particle through one or more Z atoms. The $-M^1X$ group represents a site that can react with water in reaction B1 to regenerate one or more hydroxyl groups. The groups formed in reaction B1 can serve as functional groups through which reactions A1 and B1 can be repeated, each time adding a new layer of $M^1$ atoms. Atomic layer controlled growth and additional binary reactions are described in more detail in U.S. Pat. No. 6,613,383, which is herein incorporated by reference in its entirety.

Figure 2:
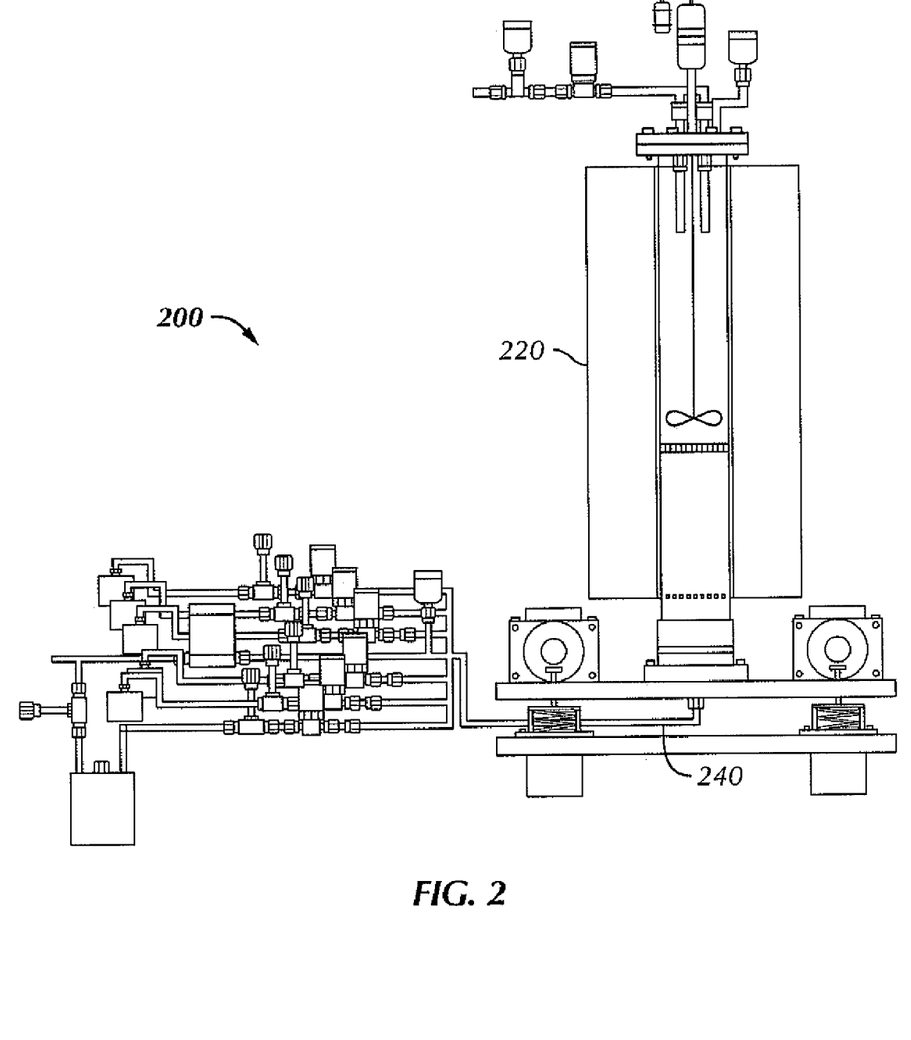
FIG. 2 shows a fluidized bed reactor that may be used in accordance with one embodiment of the present disclosure.

A convenient method for applying the ultra-thin, conformal coating to elongated nanostructures is to form a fluidized bed of the particles, and then pass the various reagents in turn through the fluidized bed under reaction conditions. Methods of fluidizing particulate material are well known and are described, for example, "Nanocoating Individual Cohesive Boron Nitride Particles in a Fluidized Bed Reactor," Jeffrey R. Wank, et al., Powder Technology 142 (2004) 59-69. Briefly, the ALD process using a fluidized bed reactor, illustrated in FIG. 2, is described. Uncoated particles may be supported on a porous plate or screen 220 within a fluidized bed reactor 200. A fluidizing gas (such as $N_2$) may be passed into the reactor 200 through line 240 and upwardly through the plate or screen 220, lifting the particles and creating a fluidized bed. Fluid (gaseous or liquid) reagents may be introduced into the bed 200 also through line 240 for reaction with the surface of the particles. The fluidizing gas may also act as an inert purge gas following each dosing of the particles with reagent for removing unreacted reagents and volatile or gaseous reaction products.

If desired, multiple layers of ultra-thin coatings may be deposited on the elongated nanostructures. For example, an intermediate ultra-thin layer may be applied to provide a surface to which a desired outer layer can be applied more easily. Where multiple layers of coating are desired, the multiple layers may possess identical compositions, or the multiple layers may vary in composition. It is specifically within the scope of the present disclosure that the multiple layers may include combinations of any of the above described coating compositions such, for example, metal-on-metal, metal-on-oxide, and oxide-on-oxide. One of ordinary skill in the art would recognize that depending on the compositions of the applied coating, during any subsequent sintering conditions, the coating may undergo a number of transitions. For example, an ALD bi-layer of $Al_2O_3/TiO_2$, after sintering, may react and form an aluminum titanate coating. Further, one of ordinary skill in the art would recognize that there is no limitation on the combination or number of layers which may be provided on the particulate material of the present disclosure. It is also specifically within the scope of the present disclosure that a subsequent coating layer may be deposited by a method other than ALD, such as CVD or PVD, for example, on an ALD-deposited coating.

Alternatively, a coating may be applied using atomic layer deposition methods as described above, and the coating may subjected to one or more reactions to form a modified coating. This technique may be used, for example, for creating ultra-thin coatings of various types that are not amenable to deposition using atomic layer deposition techniques. For example, various types of ultra-thin oxide coatings can be formed using the atomic layer deposition techniques described above, and then can be carburized to convert the oxide to the corresponding carbide.

The coatings disclosed herein may, in various embodiments, be either amorphous or crystalline in nature. Further, if a coating is amorphous in nature and is desirably crystalline, the particle having the coating thereon may be placed in a furnace at the appropriate environment for crystallization of the coating. In a particular embodiment, crystallization may occur in air at temperature of at least 600° C.

Further, various inorganic elongated nanostructures that may find use in the composites of the present disclosure may include those formed using a carbon nanostructures as a template, applying a conformal coating via ALD on the nanostructures, and then removing the carbon nanostructure, such as by etching, to form an inorganic nanotube. Such inorganic coatings, and thus nanostructures, may include the various coatings described above. U.S. Pat. No. 7,005,391, which is herein incorporated by reference in its entirety, discloses the formation of such inorganic nanotubes via ALD and subsequent etching of the underlying carbon nanotube template.

In a particular embodiment, the composites of the present disclosure may be prepared by forming a mixture or blend of diamond particles and binder/catalyst with a elongated nanostructure filler dispersed in the mixture. The amount of nanostructure filler that may be used in the composites of the present disclosure may range from about 0.5 to 50 parts by volume (of the mixture) in one embodiment, and from 1 to 20 parts by volume in another embodiment. In yet another embodiment, the nanostructures may be present in an amount up to 10 percent by volume.

Integration of elongated nanostructures into the composite body may include any means as known to those skilled in the art. As used herein, integration refers to any means for adding the nanostructures to a component of the composite body such that the nanostructures are a component of the formed composite body, i.e., by dispersion or other forms of incorporation of the nanostructures as known to those skilled in the art. In some embodiments the nanostructures may be integrated in such a manner so as to achieve a generally uniform dispersion of the nanostructures through the formed composite body.

For example, in one embodiment, blending of the elongated nanostructures with diamond or CBN particles may be accomplished by any suitable wet mixing technique that will provide a dispersion of the nanostructures in the diamond or CBN particles. Typically, a homogenous dispersion, with minimal agglomeration and clumping may be prepared, for example, by dispersing the components, individually or as a mixture, in a mixing medium, such as a low molecular weight alcohol (e.g., ethanol), with an ultrasonic probe, blending the dispersions of the components that are individually dispersed, and evaporating the solvent in an ultrasonic bath. Further, the mixing media may optionally contain a surfactant, as known to those of skill in the art, which may further promote dispersion of the nanostructures in the particulate phase. Further, while reference is made to the wet mixing of nanostructures with diamond or CBN particles, one of ordinary skill in the art would appreciate that nanostructures may alternatively be mixed with the binder phase.

Further, dry mixing or mixing with other volatile media may be used. Mechanical mixing may be performed by ball-milling in conventional rotary mills that mix the powder mixture with the assistance of tumbling balls. The sizes of the balls, the number of balls used per unit volume of powder, the rotation speed of the mill, the temperature at which the milling is performed, and the length of time that milling is continued can all vary widely. Best results may generally be achieved with a milling time ranging from about 4 hours to about 50 hours. The degree of mixing may also be affected by the "charge ratio," which is the ratio of the mass of the balls to the mass of the powder. A charge ratio of from about 5 to about 20 will generally provide proper mixing. The milling may be performed on the powders while suspended in the liquid suspending agent referred to above.

Alternatively, one of ordinary skill in the art would recognize that other means may be used to integrate or incorporate elongated nanostructures into the composites of the present disclosure, such as, for example, vapor co-deposition (in which the nanostructure material and a particulate phase are sublimed, mixed in the vapor phase, and then condensed on a substrate), spraying coating of particles (either diamond or binder particles) (such as that described in U.S. Patent Publication No. 20030012951, which is herein incorporated by reference in its entirety), infiltration by electromagnetic levitation (such as that described in U.S. Patent Publication No. 2004/0206470, which is herein incorporation by reference in its entirety), extrusion, either high or regular shear, (such as that described in U.S. Patent Publication No. 20040029706, which is herein incorporated by reference in its entirety), or infiltration of a preform (such as that described in U.S. Pat. No. 6,934,600).

In various embodiments, the nanostructures may be incorporated in the composite body in such a manner as to form a random distribution. In other embodiments, however, the nanostructures may be incorporated in such as manner so that the nanostructures may have an oriented structure, such as uniform orientation in two dimensions or three dimensions. U.S. Pat. Nos. 7,105,596 and 6,790,425, which are herein incorporated by reference in their entirety, discuss the macroscopic assembly of nanostructures in a structure.

Composites of the present disclosure may be prepared by a number of different methods, e.g., by high pressure, high temperature sintering, hot pressing, infiltration, solid state or liquid phase sintering, pneumatic isostatic forging, spark plasma sintering, microwave sintering, gas phase sintering, hot isostatic pressing (HIPing) as described in U.S. Pat. No. 5,290,507 that is incorporated herein by reference, and rapid omnidirectional compaction (ROC) as described in U.S. Pat. Nos. 4,945,073; 4,744,943; 4,656,002; 4,428,906; 4,341,577 and 4,124,888, which are each incorporated herein by reference, and combinations thereof. These processes are preferred because they can form the desired composite of this invention, which have improved properties of fracture toughness while maintaining wear resistance.

In a particular embodiment, a PCD composite may be formed via a high pressure, high temperature (HPHT) process to sinter "green" particles to create intercrystalline bonding between the particles. Additional examples of HPHT processes can be found, for example, in U.S. Pat. Nos. 4,694,918; 5,370,195; and 4,525,178. Briefly, to form a PCD composite, for example, an unsintered mass of diamond crystalline particles is placed within a metal enclosure of the reaction cell of a HPHT apparatus. A metal catalyst, such as cobalt, and tungsten carbide particles may be included with the unsintered mass of crystalline particles. The reaction cell is then placed under processing conditions sufficient to cause the intercrystalline bonding between the diamond particles. If too much additional material, such as tungsten carbide or cobalt is present in the powdered mass of crystalline particles, appreciable intercrystalline bonding is prevented during the sintering process. Such a sintered material where appreciable intercrystalline bonding has not occurred is not within the definition of PCD.

A PCBN composite may similarly be formed by sintering boron nitride particles (typically CBN) via a HPHT process, similar to those for PCD, to sinter "green" particles to create intercrystalline bonding between the particles. CBN refers to an internal crystal structure of boron atoms and nitrogen atoms in which the equivalent lattice points are at the corner of each cell. Boron nitride particles typically have a diameter of approximately one micron and appear as a white powder. Boron nitride, when initially formed, has a generally graphite-like, hexagonal plate structure. When compressed at high pressures (such as 106 psi), CBN particles will be formed with a hardness very similar to diamond, and a stability in air at temperatures of up to 1400° C.

According to one embodiment of the invention, the PCBN regions may include a content of boron nitride of at least 50% by volume; at least 70% by volume in another embodiment; at least 85% by volume in yet another embodiment. In another embodiment, the cubic boron nitride content may range from 50 to 80 percent by volume, and from 80 to 99.9 percent by volume in yet another embodiment. The residual content of the polycrystalline cubic boron nitride composite may include at least one of Al, Si, and mixtures thereof, carbides, nitrides, carbonitrides and borides of Group IVa, Va, and VIa transition metals of the periodic table. Mixtures and solid solutions of Al, Si, carbides, nitrides, carbonitrides and borides of Group IVa, Va, and VIa transition metals of the periodic table may also be included.

Additionally, a preformed metal carbide substrate may be included. In which case, the processing conditions can join the sintered crystalline particles to the metal carbide substrate. Similarly, a metal substrate having one or more transition layers attached thereto may be used in the process to add another transition layer or a PCD or PCBN layer. A suitable HPHT apparatus for this process is described in U.S. Pat. Nos. 2,947,611; 2,941,241; 2,941,248; 3,609,818; 3,767,371; 4,289,503; 4,673,414; and 4,954,139.

Composites of this invention can be used in a number of different applications, such as tools for mining and construction applications, where mechanical properties of high fracture toughness, wear resistance, and hardness are highly desired. Composites of this invention can be used to form wear and cutting components in such downhole cutting tools as roller cone bits, percussion or hammer bits, and drag bits, and a number of different cutting and machine tools.

Figure 6:
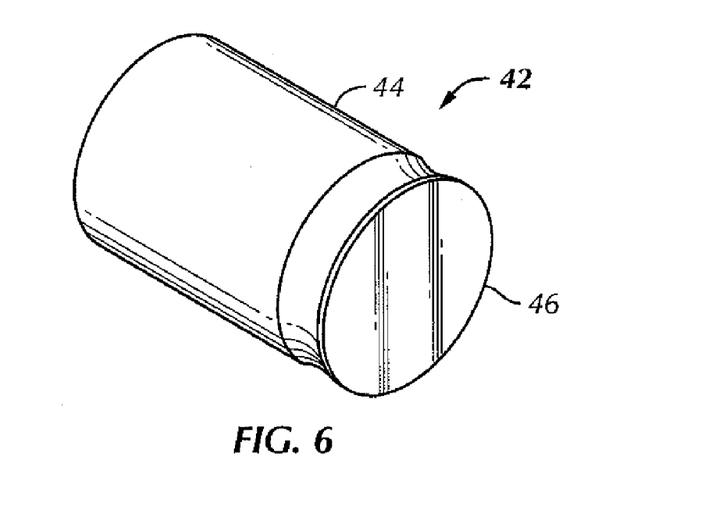
FIG. 6 is a schematic perspective side view of a shear cutter comprising a composite of the present disclosure.
Figure 7:
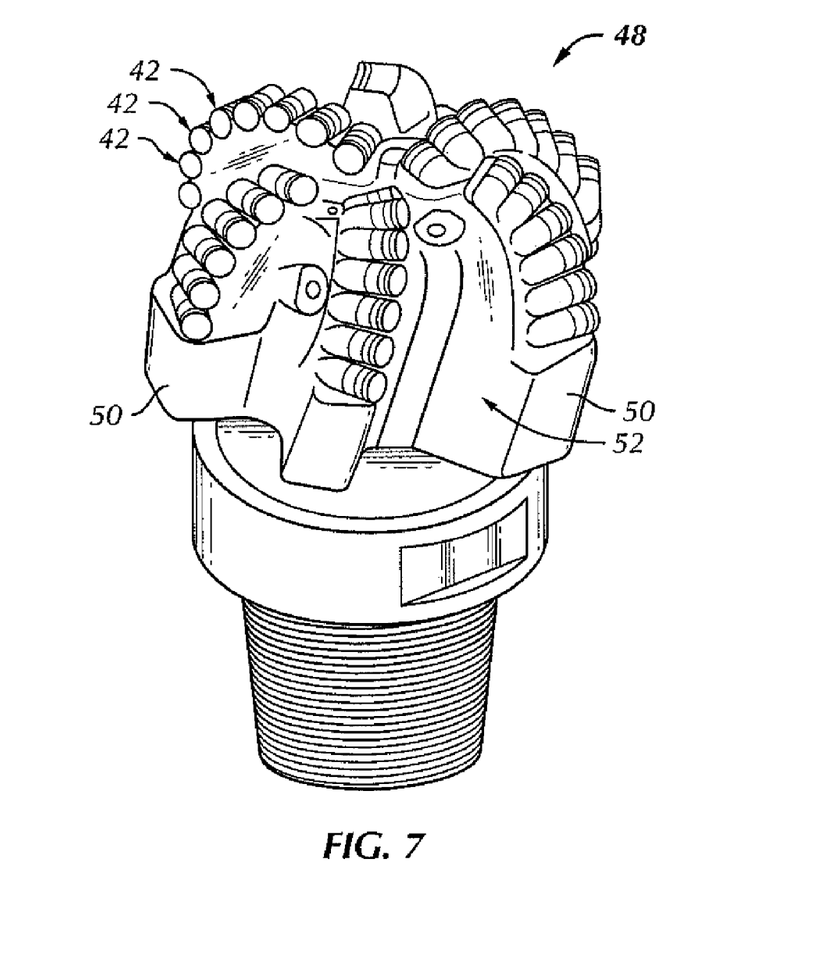
FIG. 7 is a perspective side view of a drag bit comprising a number of the shear cutters of FIG. 6.

Referring to FIG. 6, for example, composites of the present disclosure may be used to form shear cutters 42 that are used with a drag bit for drilling subterranean formations. More specifically, composites may be used to form a sintered surface layer on a cutter or substrate 44. Referring to FIG. 7, a drag bit 48 comprises a plurality of such shear cutters 42 that are each attached to blades 50 that extend from a head 52 of the drag bit for cutting against the subterranean formation being drilled. In a particular embodiment, the composite material may be used in the bit body of a drag bit.

Integrating elongated nanostructures in a PCD cutter may be used to distribute heat generated at the diamond cutting surface to the center of the diamond cutting table. During use of a cutting element, for example, high levels of frictional heat are generated by the cutting action between the formation and the cutting element. Conventional PCD composites, possessing cobalt within interstitial spaces, frequently retain such generated heat because the cobalt in the composite poorly conducts heat away from the diamond cutting surface. Such retention of heat may cause localized graphitization of the PCD cutter, thereby leading to early failure of the diamond table and poor cutter performance. Incorporation of elongated nanostructures, with high thermal conductivities, into the PCD structure may allow for formation of a heat sink to allow for faster heat transfer away from the diamond cutting surface, which may cool the diamond cutting edge and prevent graphitization and increased chipping. For example, carbon nanotubes transfer heat at a rate approximately over ten times better than silicon or cobalt, for example.

Depending on the type of particulate material used to form the composite, the various composites can be used to form a wear resistant surface in such applications in the form of one or more substrate coating layers, or can be used to form the substrate itself, or can be used to form a bit body component.

Figure 3:
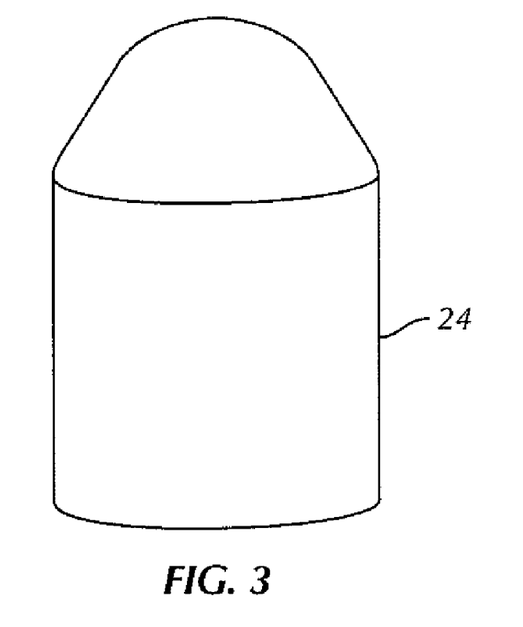
FIG. 3 is a schematic perspective side view of an insert comprising a composite of the present disclosure.
Figure 4:
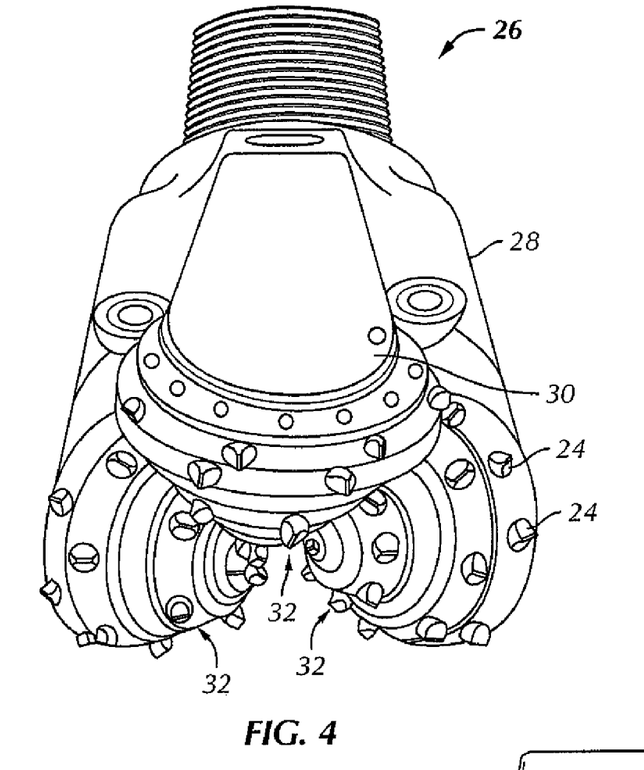
FIG. 4 is a perspective side view of a roller cone drill bit comprising a number of inserts comprising a composite of the present disclosure.

FIG. 3, for example, illustrates a mining or drill bit insert 24 that is either formed from or is coated on a composite material of the present disclosure. Referring to FIG. 4, such an insert 24 can be used with a roller cone drill bit 26 comprising a body 28 having three legs 30, and a cutter cone 32 mounted on a lower end of each leg. Each roller cone bit insert 24 can be fabricated according to one of the methods described above. The inserts 24 are provided in the surfaces of the cutter cone 32 for bearing on a rock formation being drilled.

Figure 5:
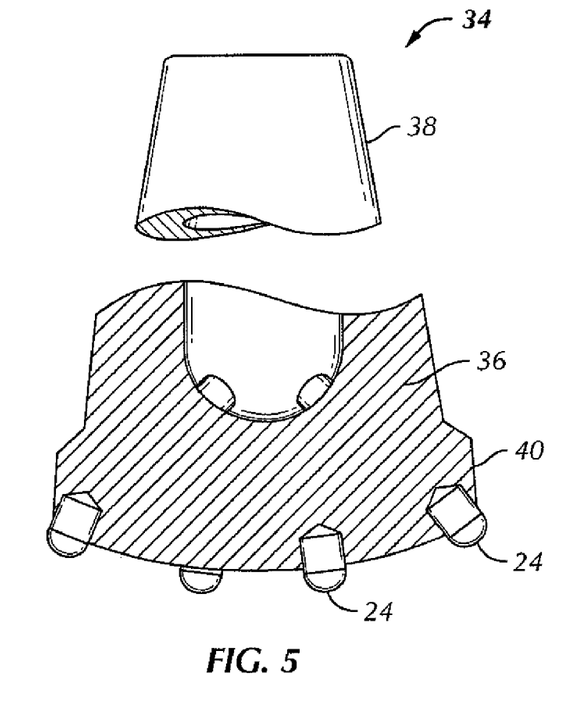
FIG. 5 is a perspective side view of a percussion or hammer bit including a number of inserts comprising a composite of the present disclosure.

Referring to FIG. 5, inserts 24 formed from composites of the present disclosure may also be used with a percussion or hammer bit 34, comprising a hollow steel body 36 having a threaded pin 38 on an end of the body for assembling the bit onto a drill string (not shown) for drilling oil wells and the like. A plurality of the inserts 24 are provided in the surface of a head 40 of the body 36 for bearing on the subterranean formation being drilled.

Figure 8:
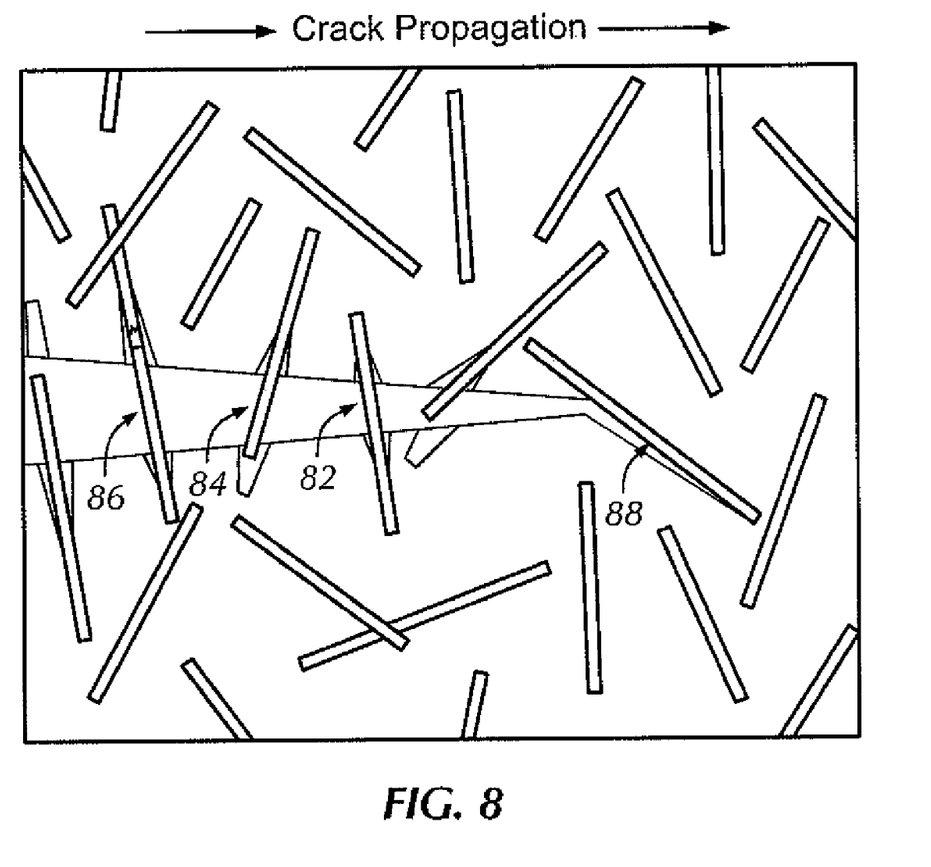
FIG. 8 is a schematic according to one embodiment of the present disclosure.

In addition to thermal advantages, composites of the present disclosure having reinforcing nanotube materials therein may also provide for an increase in toughness. As shown in FIG. 8, as a material is subjected to a load, and as a crack begins to propagate through the material, it is postulated that the nanotube materials may reinforce the composite material in one or more of several mechanisms. First, incorporation of nanotubes may allow for fiber bridging 82, i.e., the bridging of the crack wake by the nanotubes. A toughening effect may also be achieved by either the nanotubes distributing load from the crack tip while remaining intact, debonding between the nanotubes and the surrounding material followed by pull-out 84, and/or fracture of the individual nanotubes 86 followed by energy adsorption through pull-out of the broken nanotube. An alternative theory of a toughening mechanism is crack deflection 88. When a crack propagates through a material, a nanotube being of greater strength than the surrounding material, depending on the orientation of the nanotube in the composite, crack propagation may be deflected away from the axis of highest stress to a less efficient plane directed by the longitudinal orientation of the nanotube. This may lead to increased fracture energy through increased fracture surface area and lower driving forces due to the reduced resolved normal stresses at the crack tip.

Advantageously, embodiments of the present disclosure may provide for at least one of the following. By incorporating an elongated nanostructure into a diamond or CBN material, sintered PCD or PCBN composite materials may be formed having an increased thermal stability and toughness. Thermal stability may be achieved by the high thermal conductivity of the nanostructures, which may act as heat sinks to draw heat away from the diamond cutting heat, reducing and/or preventing graphitization and cracking. Further, because of the materials may possess a negative thermal expansion coefficient, the materials actually shrink at elevated temperatures, thus negating stresses caused by a dual- or multi-element differences in thermal coefficients and allowing for a reduction in the incidents of microfractures caused by different rates of expansion.

Furthermore, because the increases in toughness may be obtained by adding nanostructures, the fracture toughness may be increased without substantially altering the composition, and thus wear resistance of the body. Incorporation of coated fibrous nanostructures may also prevent oxidation of the diamond composite. Additionally, improvements in creep resistance and stress relaxation in coated nanotubes may further allow for improved high temperature performance of reinforced cutting components.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A polycrystalline composite comprising:
   a plurality of interconnected diamond particles forming a polycrystalline diamond lattice structure;
   a refractory or binder material; and
   a plurality of elongated nanostructures integrated into the polycrystalline composite.

2. The polycrystalline composite of claim 1, further comprising a carbide substrate attached to the polycrystalline composite.

3. The polycrystalline composite of claim 1, wherein the polycrystalline composite is thermally stable.

4. The polycrystalline composite of claim 1, wherein the refractory or binder material is a metal catalyst.

5. The polycrystalline composite of claim 1, wherein the plurality of elongated nanostructures comprise carbon nanotubes.

6. The polycrystalline composite of claim 5, wherein the nanotubes comprise single-walled carbon nanotubes, multi-walled carbon nanotubes, or combinations thereof.

7. The polycrystalline composite of claim 1, wherein the plurality of plurality of elongated nanostructures comprise inorganic nanotubes.

8. The polycrystalline composite of claim 7, wherein the inorganic nanotube is formed by depositing an inorganic coating by atomic layer deposition on a carbon nanotube and removing the carbon nanotube.

9. The polycrystalline composite of claim 1, wherein the plurality of plurality of elongated nanostructures comprises a coating deposited by atomic layer deposition disposed thereon.

10. The polycrystalline composite of claim 9, wherein the coating has a thickness of less than 100 nm.

11. The polycrystalline composite of claim 9, wherein the coating comprises at least one of a metal, ceramic materials, alloys thereof, or combinations thereof.

12. The polycrystalline composite of claim 9, wherein the coating comprises multiple layers of coating.

13. The polycrystalline composite of claim 1, wherein at least one of an end cap or sidewall of the plurality of elongated nanostructures is functionalized.

14. The polycrystalline composite of claim 1, wherein the plurality of elongated nanostructures have a non-uniform orientation.

15. The polycrystalline composite of claim 1, wherein the plurality of elongated nanostructures integrated into the polycrystalline composite is present in an amount up to 10 percent by volume.

16. The polycrystalline composite of claim 1, wherein the polycrystalline composite is thermally stable at temperatures greater than 750° C.

17. A method of forming a polycrystalline composite body for cutting tools, comprising:

integrating a plurality of plurality of elongated nanostructures in one of a plurality of diamond particles or a binder material;

mixing in the other of the plurality of diamond particles or binder material; and sintering the mixture to form a polycrystalline diamond lattice structure.

18. The method of claim 17, wherein the integrating comprises dispersing the plurality of plurality of elongated nanostructures in the plurality of diamond particles.

19. The method of claim 17, wherein the integrating comprises dispersing the plurality of plurality of elongated nanostructures into a plurality of refractory particles.

20. A method of incorporating functionalized nanotubes in a polycrystalline material, comprising:

applying a coating to nanotubes by atomic layer deposition;

mixing a plurality of diamond particles, a refractory or binder material, and a plurality of the coated nanotubes; and sintering the mixture to form a polycrystalline diamond lattice structure.

21. The method of claim 20, wherein the coating comprises at least one of a metal, ceramic materials, alloys thereof, or combinations thereof.

* * * * *